US011115533B2

United States Patent
Williams et al.

(10) Patent No.: US 11,115,533 B2
(45) Date of Patent: *Sep. 7, 2021

(54) UNIFIED CROSS CHANNEL COMMUNICATIONS

(71) Applicant: VIRTUAL HOLD TECHNOLOGY SOLUTIONS, LLC, Akron, OH (US)

(72) Inventors: Mark J. Williams, North Canton, OH (US); Jeremy Starcher, Canal Fulton, OH (US); Kevin Shinseki, San Carlos, CA (US)

(73) Assignee: VIRTUAL HOLD TECHNOLOGY SOLUTIONS, LLC, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,533

(22) Filed: Jul. 24, 2019

(65) Prior Publication Data

US 2020/0059560 A1 Feb. 20, 2020

Related U.S. Application Data

(63) Continuation of application No. 14/532,001, filed on Nov. 4, 2014, now Pat. No. 10,375,245, which is a continuation-in-part of application No. 13/659,902, filed on Oct. 24, 2012, now Pat. No. 8,938,221, which is a continuation-in-part of application No. 13/446,758, filed on Apr. 13, 2012, now Pat. No. 8,792,866, which is a continuation of application No. 12/320,517, filed on Jan. 28, 2009, now Pat. No. 8,213,911, application No. 16/520,533, which is a continuation of application No. 14/532,001, filed on Nov. 4, 2014, now Pat. No. 10,375,245, which is a continuation-in-part of application No. 13/659,902, filed on Oct. 24, 2012, now Pat. No. 8,938,221, which is a continuation-in-part of application No. 13/479,870, filed on May 24, 2012, now Pat. No. 9,055,149, which is a continuation-in-part of application No. 12/320,517, filed on Jan. 28, 2009, now Pat. No. 8,213,911.

(51) Int. Cl.
  *H04M 3/523* (2006.01)
  *G06Q 10/10* (2012.01)

(52) U.S. Cl.
  CPC .......... *H04M 3/5231* (2013.01); *G06Q 10/10* (2013.01); *H04M 3/5238* (2013.01)

(58) Field of Classification Search
  CPC ... H04M 3/5231; H04M 3/5238; G06Q 10/10
  See application file for complete search history.

(56) References Cited

U.S. PATENT DOCUMENTS

2013/0268656 A1* 10/2013 Bott .................... H04L 43/0876
                                                                 709/224
2016/0071147 A1*  3/2016 Iyer .................... G06Q 30/0242
                                                                 705/14.41
2020/0068031 A1*  2/2020 Kursun ................ H04L 67/306

* cited by examiner

*Primary Examiner* — Jerry B Dennison
(74) *Attorney, Agent, or Firm* — Brian R. Galvin; Galvin Patent Law LLC (57) ABSTRACT

A method for unified cross-channel communications comprising a plurality of network-connected user devices, a plurality of communication channels that receive and handle interactions from user devices, and a virtual communications interceptor that connects to the communications channels and intercepts or otherwise receives data from them according to various means and provides connections between the communication channels.

4 Claims, 7 Drawing Sheets

UNIFIED CROSS CHANNEL COMMUNICATIONS

CROSS-REFERENCE TO RELATED APPLICATIONS

| application Ser. No. | Date Filed | Title |
|---|---|---|
| Current application | Herewith | UNIFIED CROSS CHANNEL COMMUNICATIONS is a continuation of: |
| 14/532,001 | Nov. 4, 2014 | UNIFIED CROSS CHANNEL COMMUNICATIONS which is a continuation-in-part of: |
| 13/659,902 U.S. Pat. No. 8,938,221 | Oct. 24, 2012 Issue Date Jan. 20, 2015 | SYSTEM AND METHOD FOR PROVIDING A CALLBACK CLOUD which is a continuation-in-part of: |
| 13/446,758 U.S. Pat. No. 8,792,866 | Apr. 13, 2012 Issue Date Jul. 29, 2014 | COMMUNICATION DEVICE FOR ESTABLISHING CALL BACK which is a continuation of: |
| 12/320,517 U.S. Pat. No. 8,213,911 | Jan. 28, 2009 Issue Date Jul. 3, 2012 | MOBILE COMMUNICATION DEVICE FOR ESTABLISHING AUTOMATED CALL BACK |
| Current application | Herewith | UNIFIED CROSS CHANNEL COMMUNICATIONS is a continuation of: |
| 14/532,001 | Nov. 4, 2014 | UNIFIED CROSS CHANNEL COMMUNICATIONS which is a continuation-in-part of: |
| 13/659,902 U.S. Pat. No. 8,938,221 | Oct. 24, 2012 Issue Date Jan. 20, 2015 | SYSTEM AND METHOD FOR PROVIDING A CALLBACK CLOUD which is a continuation-in-part of: |
| 13/479,870 U.S. Pat. No. 9,055,149 | May 24, 2012 Issue Date Jun. 9, 2015 | MANAGING, DIRECTING, AND QUEUING COMMUNICATION EVENTS USING IMAGE TECHNOLOGY which is a continuation-in-part of: |
| 12/320,517 U.S. Pat. No. 8,213,911 | Jan. 28, 2009 Issue Date Jul. 3, 2012 | MOBILE COMMUNICATION DEVICE FOR ESTABLISHING AUTOMATED CALL BACK | the entire specification of each of which is incorporated by reference.

BACKGROUND OF THE INVENTION

Field of the Art

The disclosure relates to the field of electronic communications, and more particularly to the field of intercepting and unifying communications across various systems.

Discussion of the State of the Art

Today's consumer has many options when it comes to how they can communicate with the companies they do business with. Communication technology has expanded rapidly over the last 10 years, led by web and mobile applications that provide the customer with more information and options than ever before. While options are typically a good thing, the rapid expansion in applications and channels has created some challenges for the enterprises that deploy them and the customers that try to use them.

While technology providers speak about unified communications across the enterprise, very little true integration has been done across channels to truly unify technology and information in an intelligent way that reduces the steps and provides a proactive and positive experience for the customer. Enterprises utilize services such as web, mobile, inbound and outbound voice, text, email and chat, and these channels are supported by routing, IVR, and ACD systems on the back end. Most enterprises utilize multiple providers for each of these technologies, and each provider typically supports a different strategy putting their technology in the center of the overall solution. This approach usually ends up not producing the desired results.

Enterprises are quickly deploying these technologies and are seeing some success in a limited scope, but when viewing the process from the customer perspective there can be a higher level of difficulty in getting their questions answered. Usually technology decisions are made by different departments/organizations within the enterprise, and each for different reasons, which further complicates the matter for the customer. Customers may start in one channel and end up crossing two or three additional channels trying to accomplish their goal, and each time they must restart their process from the beginning in order to navigate to the right information or resource that can help.

What is needed is a means to intercept communications across a variety of channels, and enable a unified approach to handling these communications.

SUMMARY OF THE INVENTION

Accordingly, the inventor has conceived and reduced to practice, a method for unified cross-channel communications comprising a plurality of network-connected user devices, a plurality of communication channels that receive and handle interactions from user devices, and a virtual communications interceptor that connects to the communications channels and intercepts or otherwise receives data from them according to various means and provides connections between the communication channels, and a method for intercepting and unifying communications between various channels.

According to a preferred embodiment of the invention, a method for unified cross-channel communications comprising a plurality of network-connected user devices such as personal computers or mobile computing devices, a plurality of communication channels that may receive and handle interactions from user devices, and a virtual communications interceptor that may connect to the communications channels and intercept or otherwise receive data from them according to various means (such as by actively requesting specific data, or streaming data in a passive manner as it becomes available) and may provide connections between the communication channels (such as to make information from one channel available to another), as well as provide guidance to such systems such as to support a customer across multiple systems as needed, is disclosed.

According to the embodiment, a virtual communication interceptor (VCI) may be a platform independent system (i.e., it may operate alongside a variety of external systems or components as necessary, regardless of their specific nature or design) that facilitates connections between a variety of enterprise communication channels such as an email server or telephone interactive voice response (IVR) or resources such as databases or particular communication endpoints (for example, a particular contact center agent), and may provide intelligent guidance to such systems as to how best support a customer, such as based at least in part on what may have prompted the customer interaction or what the customer is doing (such as any actions performed or information entered, such as when filling out a form to request support) as they cross channels of communications.

For example, a cable customer may be watching TV and be presented with an "error 5808" message when changing channels. This may mean nothing to the customer, but indicates that they may need to try and resolve an issue with the cable company. The customer may check online (such as by searching for assistance from the cable provider's website, or from other users of the service) first to see if they can resolve this matter on their own, but after some time they may decide to try and call a contact number for the provider (such as to speak with a technical support agent). After calling the number, they may be greeted by an interactive voice response (IVR) and be required to spend more time entering information (often, the same information they may have already entered into the website while searching for assistance), and they are finally delivered to a support resource (such as a tech support specialist).

According to the embodiment, in the example a VCI would have seen the "error 5808" message, and then seen that the customer went onto the website. At that moment VCI could instruct the web server to display a message to the customer that technical support is required (based on the nature of the specific issue being reported) and the VCI will have a support specialist contact them within a specified timeframe. In this manner, the VCI has reduced the demand put onto existing enterprise systems, and provided a better experience to the customer by proactively understanding what the customer wanted and directing them past all the static independent channel processes.

According to another preferred embodiment of the invention, a method for unifying communications across various channels comprising the steps of connecting a VCI to communication channels, monitoring channels for user interaction, intercepting user interaction information, monitoring channels for additional user interaction, and making interaction information available to other active channels as needed, is disclosed. According to the embodiment, an active channel may be any communication system, service, or product that a user is currently interacting with. An example of an active channel may be a company website that a user is actively interacting with via a web browser (such as to search for information, or to submit input for assistance), or a telephone number that a user has called (such as to contact a customer service or technical support agent, for example). In this manner, information such as user input or other information that may be available (such as a user's device information or basic interaction-specific details such as the time or location of an interaction taking place) may be intercepted from one channel, such as a website, and provided to another when a user interacts with it, such as when a user may have been searching a website for assistance and then resorted to calling for technical support. In the example, any information obtained may be made available to telephone-connected systems such as an interactive voice response (IVR) system, such as to speed up user interaction and more efficiently assist with an issue.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

The inventor has conceived, and reduced to practice, a system for unified cross-channel communications and a method for unifying communications across various channels.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 1:
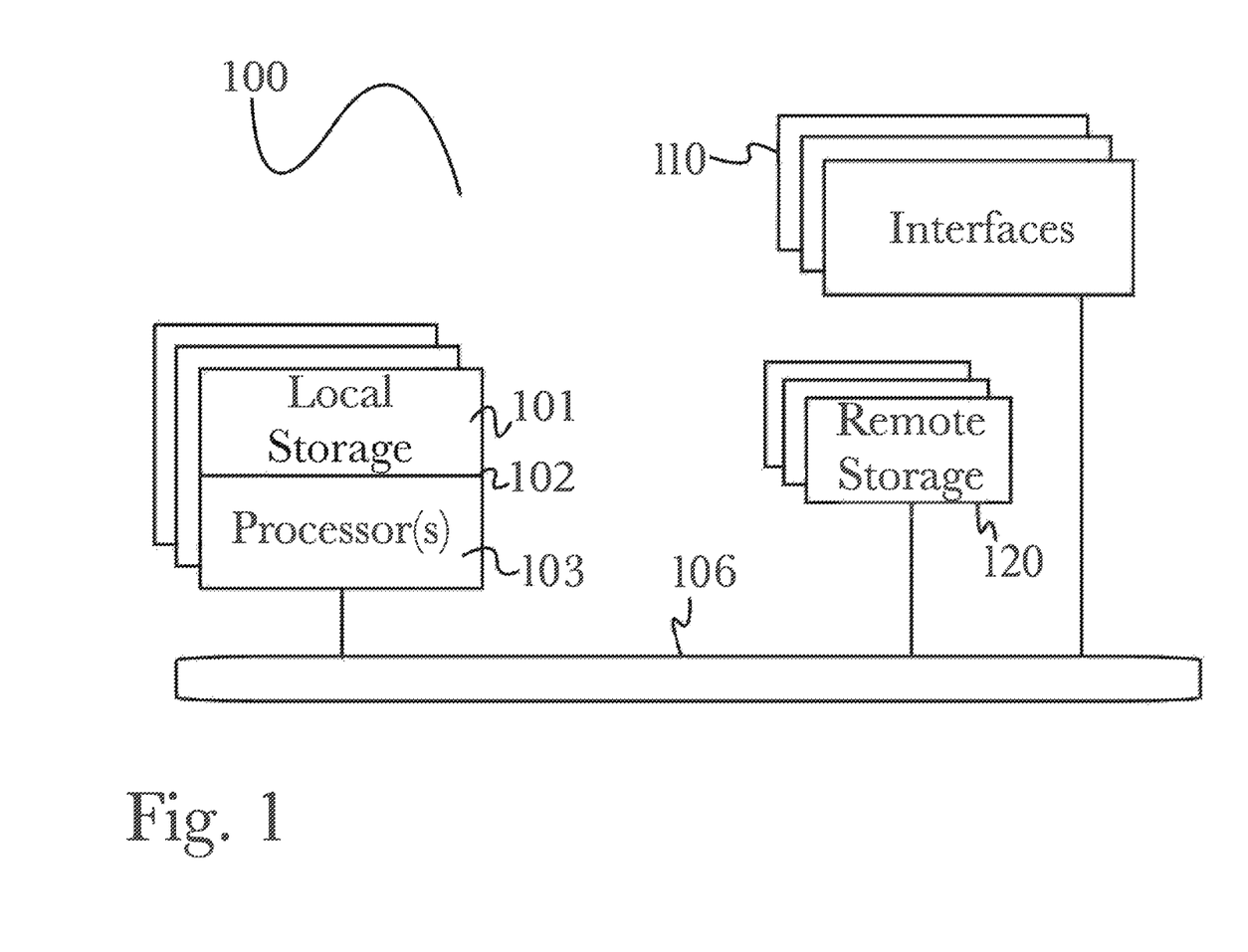
FIG. 1 is a block diagram illustrating an exemplary hardware architecture of a computing device used in an embodiment of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
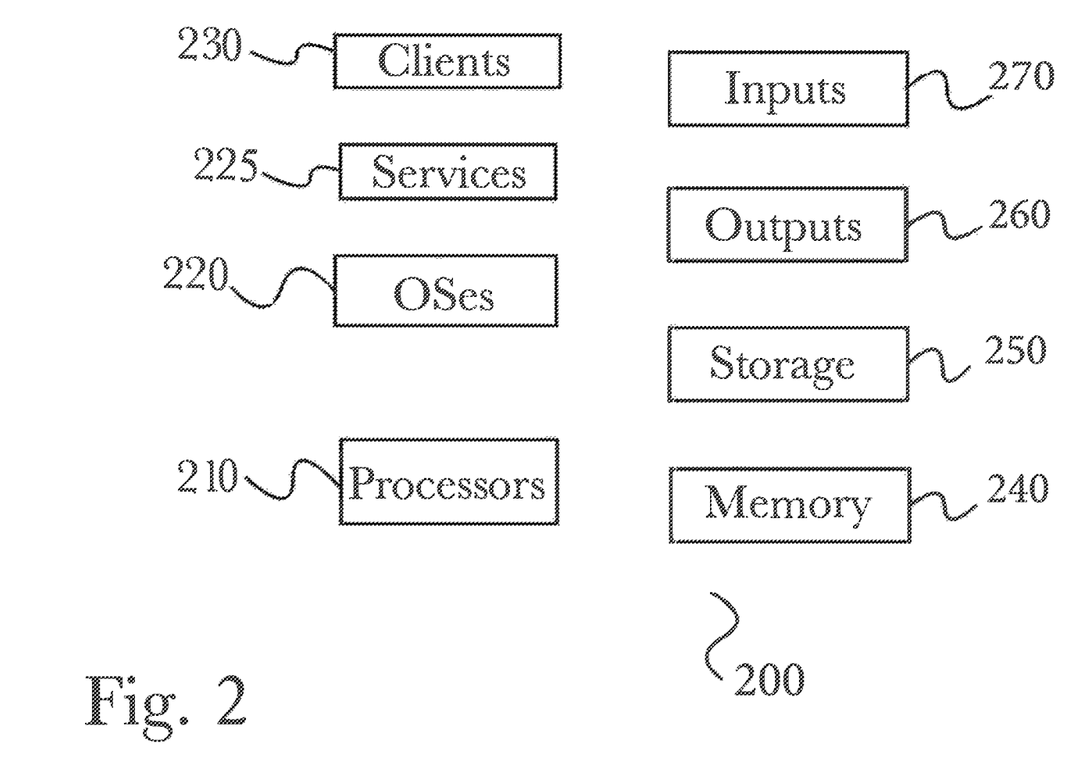
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
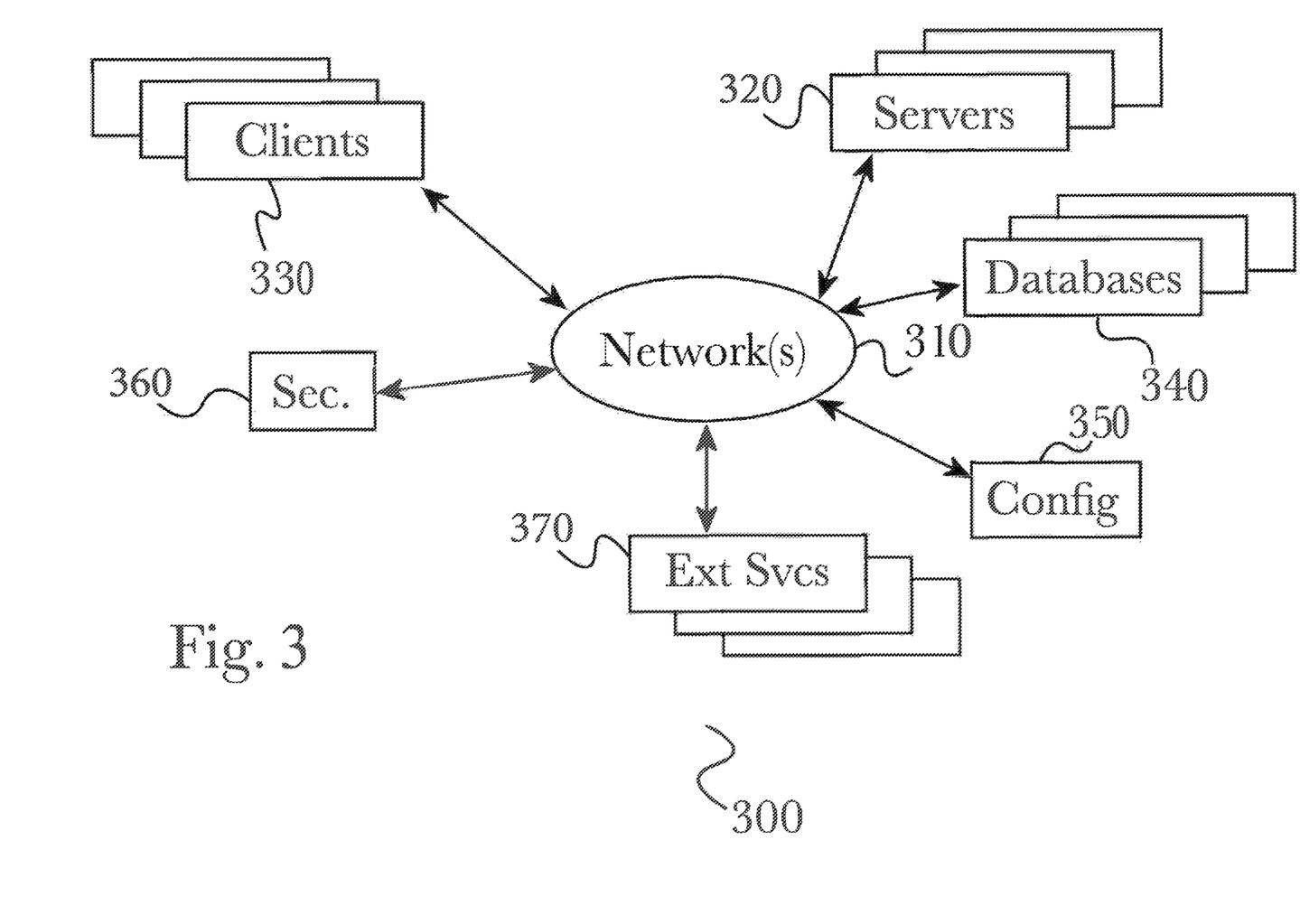
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
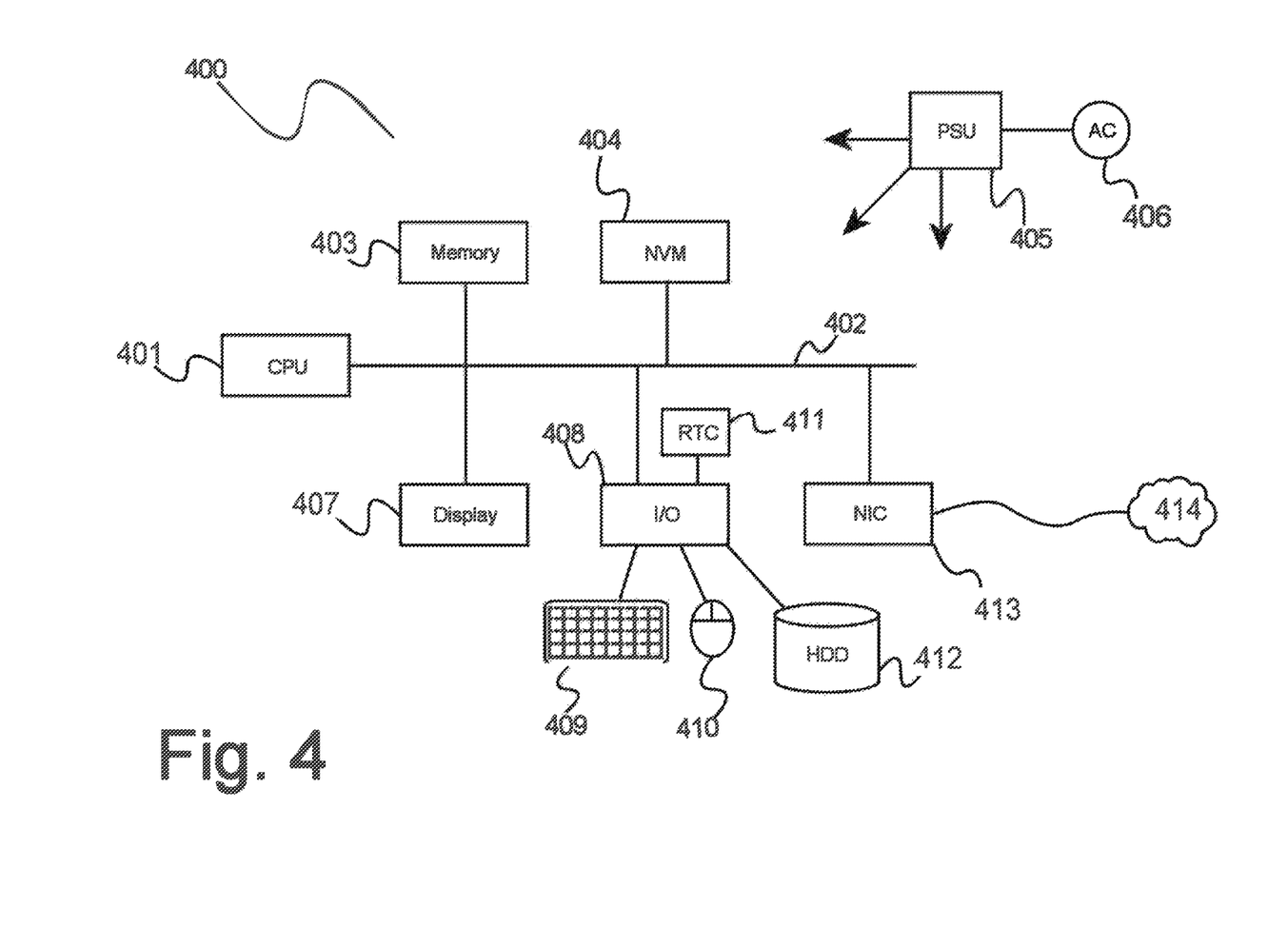
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
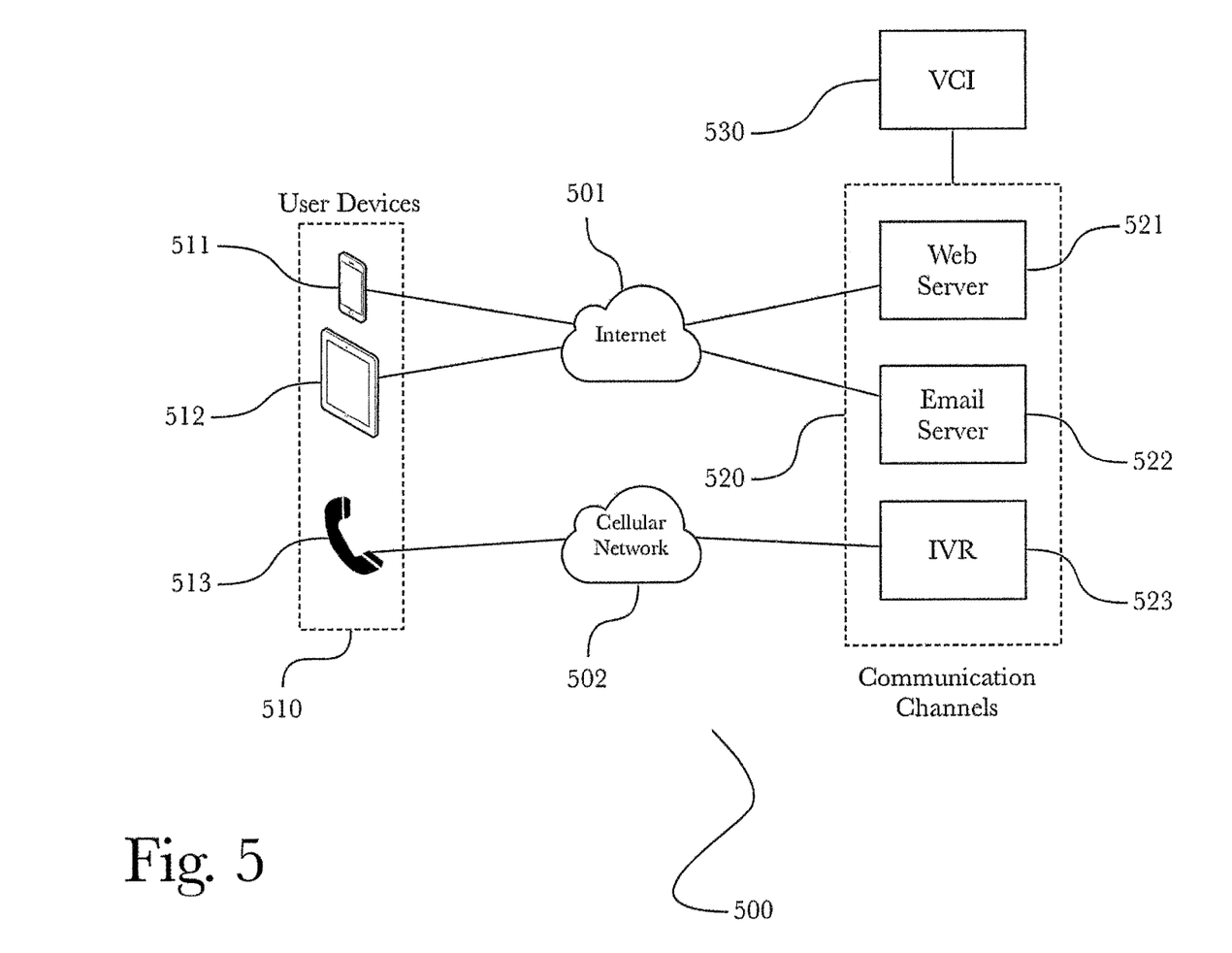
FIG. 5 is a block diagram of an exemplary system architecture for unified cross-channel communications, according to a preferred embodiment of the invention.

FIG. 5 is a block diagram of an exemplary system architecture for unified cross-channel communication, according to a preferred embodiment of the invention. As illustrated, a system 500 may comprise a plurality of user devices 510, such as a desktop or laptop personal computer 511, smartphone 512, a tablet computing device 512, or any other appropriate network-connected electronic device. User devices may connect via a communication network such as the Internet 501 or another electronic communication network such as a cellular data network 502, such as to communicate or interact with various enterprise communication channels 520 for such purposes as to communicate with an enterprise or corporate resource (such as a contact center agent or automated assistance service such as an IVR or other product or service as appropriate), or to request or submit information such as to enhance an interaction (such as submitting form data with request details or other information that may be helpful or required), or to request an interaction such as by scheduling a future-dated interaction with a contact center agent. Exemplary communication channels may include (as shown) an IVR 521 such as for receiving and handling telephone-based interactions (for example, when a user calls a support number or other telephone contact number), an email server 522 such as to handle email requests or send email messages out to user devices (such as to notify a user of new information or updates relevant to a previous interaction or request, or to enable an agent to communicate with a user via email conversation), or a web server 523 such as to handle web-based interactions such as a user searching for information online or submitting request details via the Internet (such as to request a future interaction when it may be convenient for them, by submitting necessary information in advance). In this manner, it can be appreciated that various communication channels may be utilized as appropriate, according to the specific nature of a user's device, interaction, or communication preference, and it should be further appreciated that multiple channels may be used simultaneously or interchangeably as appropriate according to the invention.

As illustrated, a VCI 530 may be connected to and in communication with communication channels 520 (such as via direct connection, as may be utilized in arrangements utilizing a VCI operating on a network-connected computing device colocated with one or more communication channels, or via a network connection over a communication network such as the Internet 501. VCI 530 may perform functions such as collection or interception of communications from connected channels (such as by methods described below, referring to FIG. 6 and FIG. 7), such as to bridge or convey communication information from one channel to another. In this manner, it may be appreciated that communications may be unified in that they can be made available to additional channels as needed through utilization of a VCI in communication with new or existing communication systems or services, enabling a unified cross-channel communication infrastructure without impacting current operations or requiring overhaul of existing systems.

Detailed Description of Exemplary Embodiments

Figure 6:
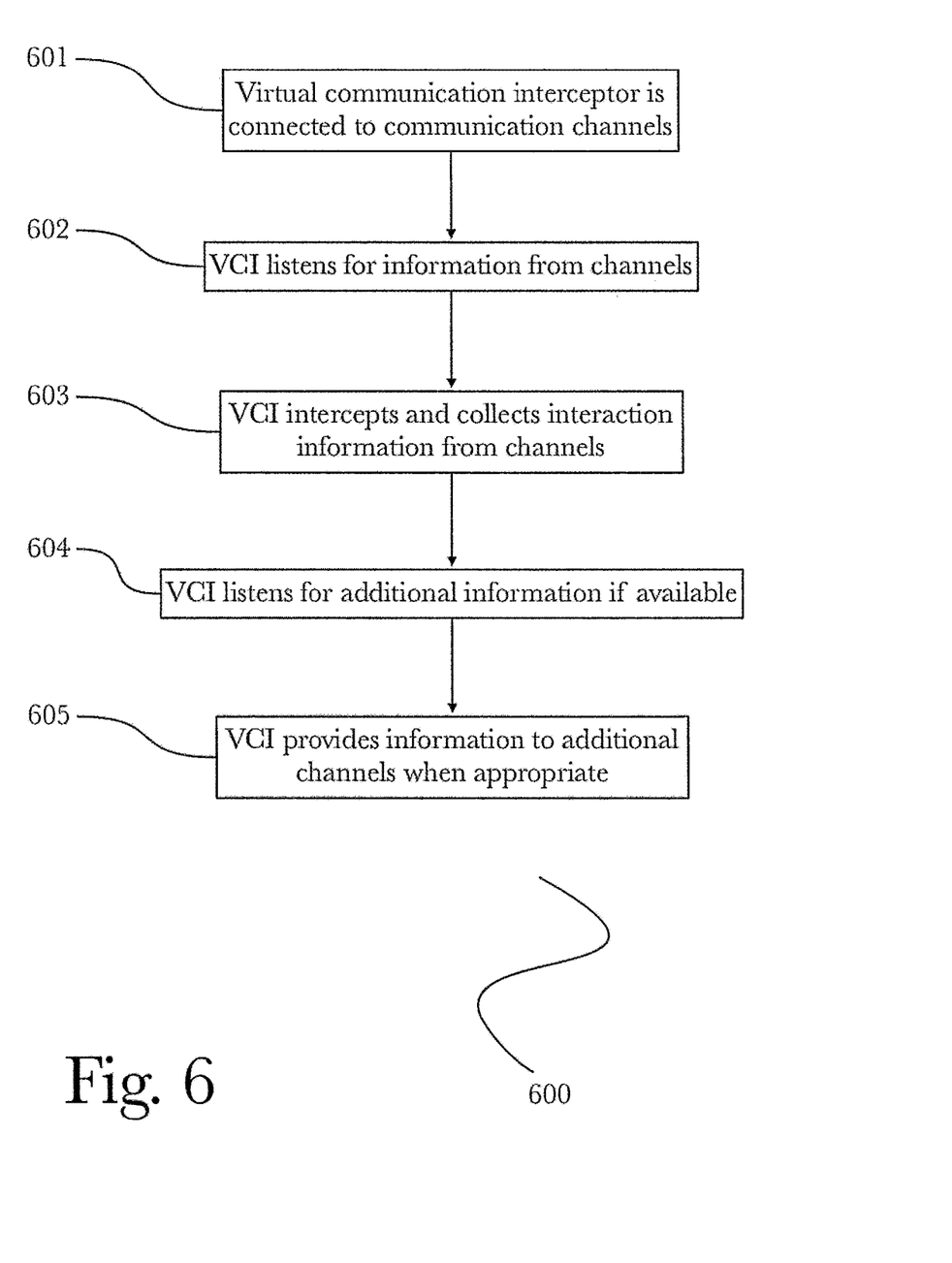
FIG. 6 is a method flow diagram illustrating an exemplary method for unified multi-channel communications, according to a preferred embodiment of the invention.

FIG. 6 is a method flow diagram, illustrating an exemplary method 600 for unified cross-channel communication, according to a preferred embodiment of the invention. As illustrated, in an initial step 601 a VCI may be connected to a plurality of communication channels, such as email or web servers, IVR systems, or other communication products, services, or systems. In a next step 602, a VCI may monitor connected channels for user interaction, such as an email, phone call, or other interaction received from a known user address. Additionally, it should be appreciated that a user may not necessarily be known at the time of interaction (such as when a prospective new customer contacts an enterprise for information, for example), and a new user may be identified by whatever means of contact they utilize (such as their phone number when calling in, or their email address as may be collected from a received email message), until any additional contact or personal information may become available. In a next step 603, a VCI may intercept user interaction information, such as the details or contact information associated with a particular communication or interaction received in a previous step 602, for example a user's email address and the apparent topic of an email conversation (as may be easily determined by parsing the subject or body text of an email, for example). In a next step 604, a VCI may monitor connected channels for additional user interaction, such as to determine when a user switches channels (for example, if a user calls for technical support after filling out an online form or sending an email). In a final step 605, a VCI may then make known interaction information (as may have been determined and collected in a previous step 603) available to other active channels as needed, thereby facilitating cross-channel communication and enhancing user experience as well as customer service efficacy.

Figure 7:
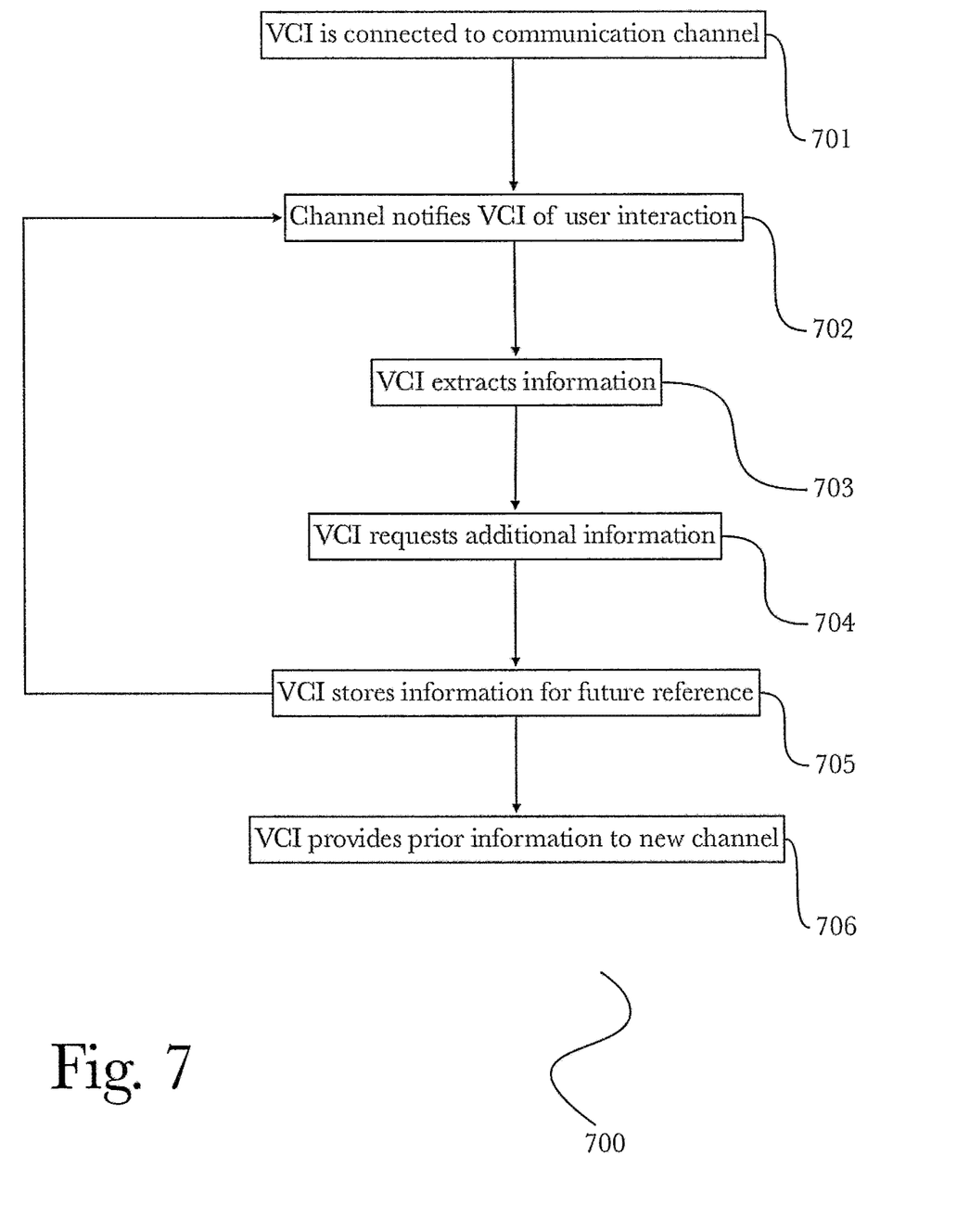
FIG. 7 is a method flow diagram illustrating an exemplary method for intercepting communications from various channels, according to the invention.

FIG. 7 is a method flow diagram, illustrating an exemplary method 700 for intercepting communications from various channels, according to an embodiment of the invention. In an initial step 701, a VCI may be connected to a communication channel, such as a web or email server, or an IVR system for telephone communications. In a next step 702, a connected communication channel may notify a VCI that a user is interacting with it, such as when a customer makes a telephone call to a customer service number or sends an email request for information. In a next step 703, a VCI may extract any available information from the status update, such as a customer's identity information or contact info, or a topic of an interaction. It should be appreciated that the specific nature of information extracted may vary according to the nature of a particular interaction. In a next step 704, a VCI may request additional information from the communication channel, such as requesting additional detail regarding the user's interaction or further personal information on the user in particular. It should be appreciated that while a request for information may be made by a VCI, it is possible that no additional information may be available, and operation will continue according to the embodiment. In a next step 705, a VCI may optionally store any information received regarding an interaction, and begin listening for further status updates from communication channels (and, as illustrated, operation may continue in a looping fashion resuming at a previous step 702). In a final step 706, a VCI may provide information regarding an interaction to a new communication channel when appropriate, such as when the VCI is notified that a user is interacting with a new communication channel regarding a known interaction (indicating, for example, that the user is seeking assistance via a new communication channel for the same issue). In this manner, it may be appreciated that the VCI facilitates cross-channel communication by storing interaction information received and making it available to additional channels whenever needed or appropriate, such that a user may not need to resubmit similar information multiple times.

The skilled person will be aware of a range of possible modifications of the various embodiments described above. Accordingly, the present invention is defined by the claims and their equivalents.

What is claimed is:

1. A method for unified cross-channel communication, comprising the steps of:

connecting a virtual communication interceptor to a plurality of communication channels between user devices and call center agents;

sending, from the plurality of communication channels, a first communication of a first type using a first communication channel to a first computing device, wherein the first computing device is adapted to receive communications of the first type and receives the first communication from a first user device;

providing interaction information pertaining to the first communication to the virtual communication interceptor, wherein the interaction information includes at least one identifier associated with a user of the first user device, and wherein the virtual communication interceptor stores at least some of the received interaction information;

transmitting at least some of the stored interaction information to a second computing device, wherein the second computing device is adapted to process a second communication of a second type in a second communication channel; wherein the second computing device is associated with a call center agent;

monitoring the plurality of communication channels for changes in the interaction information associated to the user of the first user device;

storing any changes in the interaction information associated with the user of the first user device; and transmitting any changes in the interaction information associated with the user of the first user device to the second computing device.

2. The method of claim 1, further comprising the step of:

requesting additional interaction information pertaining to the first communication from the first communication channel.

3. The method of claim 2, wherein the additional interaction information is stored for future reference.

4. The method of claim 1, wherein the at least one identifier is selected from the group consisting of the user's identity information, the user's contact information, and a topic of the first communication.

* * * * *